United States Patent
Kawabe

(10) Patent No.: US 12,374,000 B2
(45) Date of Patent: Jul. 29, 2025

(54) VIDEO GENERATION DEVICE, VIDEO GENERATION METHOD, AND PROGRAM

(71) Applicant: NIPPON TELEGRAPH AND TELEGRAPH CORPORATION, Tokyo (JP)

(72) Inventor: Takahiro Kawabe, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 192 days.

(21) Appl. No.: 17/913,420

(22) PCT Filed: Apr. 2, 2020

(86) PCT No.: PCT/JP2020/015156
§ 371 (c)(1),
(2) Date: Sep. 21, 2022

(87) PCT Pub. No.: WO2021/199395
PCT Pub. Date: Oct. 7, 2021

(65) Prior Publication Data
US 2023/0133054 A1    May 4, 2023

(51) Int. Cl.
*G06T 11/00* (2006.01)

(52) U.S. Cl.
CPC .................. *G06T 11/001* (2013.01)

(58) Field of Classification Search
CPC .......... G09G 3/003; G09G 3/004; G09G 5/10; G09G 2340/125; G06T 11/001
See application file for complete search history.

(56) References Cited

U.S. PATENT DOCUMENTS

| 11,328,635 B2 * | 5/2022 | Kawabe | G09G 5/377 |
| 2021/0256887 A1 | 8/2021 | Kawabe | |

FOREIGN PATENT DOCUMENTS

| JP | 2019192011 A | 10/2019 | |
| WO | WO-2019208194 A1 * | 10/2019 | G09G 3/003 |

OTHER PUBLICATIONS

Takahiro Kawabe, "Danswing papers", SA' 18 Posters, Dec. 4-7, 2018, Tokyo, Japan.
Kawabe et al. (2016) "Deformation Lamps: A Projection Technique to Make Static Objects Perceptually Dynamic", ACM Transactions on Applied Perception, vol. 13, No. 2, Article 10, Mar. 2016.
Takahiro Kawabe (2019) "The judgment of causality for deformations of stretchy materials" [online] Website: https://www.visionsciences.org/programs/VSS_2019_Abstracts.pdf, Vision Sciences Society May 7, 2019.
Takahiro Kawabe (2019) "The judgment of causality for deformations of stretchy materials" Vision Sciences Society 19th Annual Meeting, May 17-22, 2019, at Trade Winds Island Resorts (St. Pete Beach, Florida USA).

(Continued)

*Primary Examiner* — Antonio A Caschera

(57) ABSTRACT

A video including a stationary object region and a background region other than the stationary object region is generated. The background region includes a striped-texture region adjacent to the outline of the stationary object region, and a striped texture having a striped luminance pattern moves in a direction having a component orthogonal to the outline in the striped-texture region.

7 Claims, 14 Drawing Sheets

(56) References Cited

OTHER PUBLICATIONS

Kawabe et al. (2019) "Moiré effects on real object's appearances" [online] Website: https://www.visionsciences.org/programs/VSS_2019_Program.pdf, May 7, 2019.

Kawabe et al. (2019) "A computational analysis of Moire-induced illusory deformation" [online] website: https://www.vsac2019.org/program, Jul. 13, 2019.

Kawabe et al. (2019) "A computational analysis of Moire-induced illusory deformation" The Visual Science of Art Conference 2019, STUK Arts Center (Naamsestraat 96, 3000 Leuven, Belgium), Aug. 21-24, 2019.

Kawabe et al. (2019) "A computational mechanism for seeing dynamic deformation" [online] website: https://www.biorxiv.org/content/10.1101/682336v1.full.pdf, Jun. 26, 2019, [Revisions] Original: https://www.biorxiv.org/ontent/10.1101/682336v1.full.pdf; Second: https://www.biorxiv.org/content/10.1101/682336v2.full.pdf; Final: https://www.biorxiv.org/content/10.1101/682336v3.full.pdf.

Kawabe et al. (2020) "A Computational Mechanism for Seeing Dynamic Deformation" [online] website: https://www.eneuro.org/content/eneuro/7/2/ENEURO.0278-19.2020.full.pdf, Mar. 13, 2020.

\* cited by examiner

VIDEO GENERATION DEVICE, VIDEO GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/015156, filed on 2 Apr. 2020, the disclosure of which is hereby incorporated herein by reference in its entirety.

TECHNICAL FIELD

The present invention relates to a technology that provides illusory motion to an object which is stationary.

BACKGROUND ART

A technology of providing motion impression to an object which is stationary by projecting grayscale motion information onto the object which is stationary from a projector has been known (Non-Patent Literature 1). Another technology of presenting an object which is stationary as if the object were moving by placing the object bordered with a white-black outline line on a blinking background has been known (Non-Patent Literature 2).

CITATION LIST

Non-Patent Literature

Non-Patent Literature 1: Takahiro Kawabe, "Danswing papers", SA' 18 Posters, Dec. 4-7, 2018, Tokyo, Japan.

Non-Patent Literature 2: Takahiro Kawabe, Taiki Fukiage, Masataka Sawayama, and Shinya Nishida, "Deformation Lamps: A Projection Technique to Make Static Objects Perceptually Dynamic", ACM Transactions on Applied Perception, Vol. 13, No. 2, Article 10, March 2016.

SUMMARY OF THE INVENTION

Technical Problem

However, in Non-Patent Literature 1, the luminance of an object on which grayscale motion information is placed is different from the original luminance of the object. In Non-Patent Literature 2, since an outline line needs to be provided to an object, the appearance of the object potentially degrades.

The present invention is made in view of the above-described problem and intended to provide illusory motion to an object without changing the luminance and color of the object.

Means for Solving the Problem

To solve the above-described problem, a video including a stationary object region and a background region other than the stationary object region is generated. The background region includes a striped-texture region adjacent to the outline of the stationary object region, and a striped texture having a striped luminance pattern moves in a direction having a component orthogonal to the outline in the striped-texture region.

Effects of the Invention

Accordingly, it is possible to provide illusory motion to an object in a stationary object region without changing the luminance nor color of the object.

DESCRIPTION OF EMBODIMENTS

Embodiments of the present invention will be described below with reference to the accompanying drawings.

First Embodiment

In the present embodiment, a moving striped texture is presented on the background of an object which is stationary to provide visual effects of movement and deformation to the object.

Figure 1:
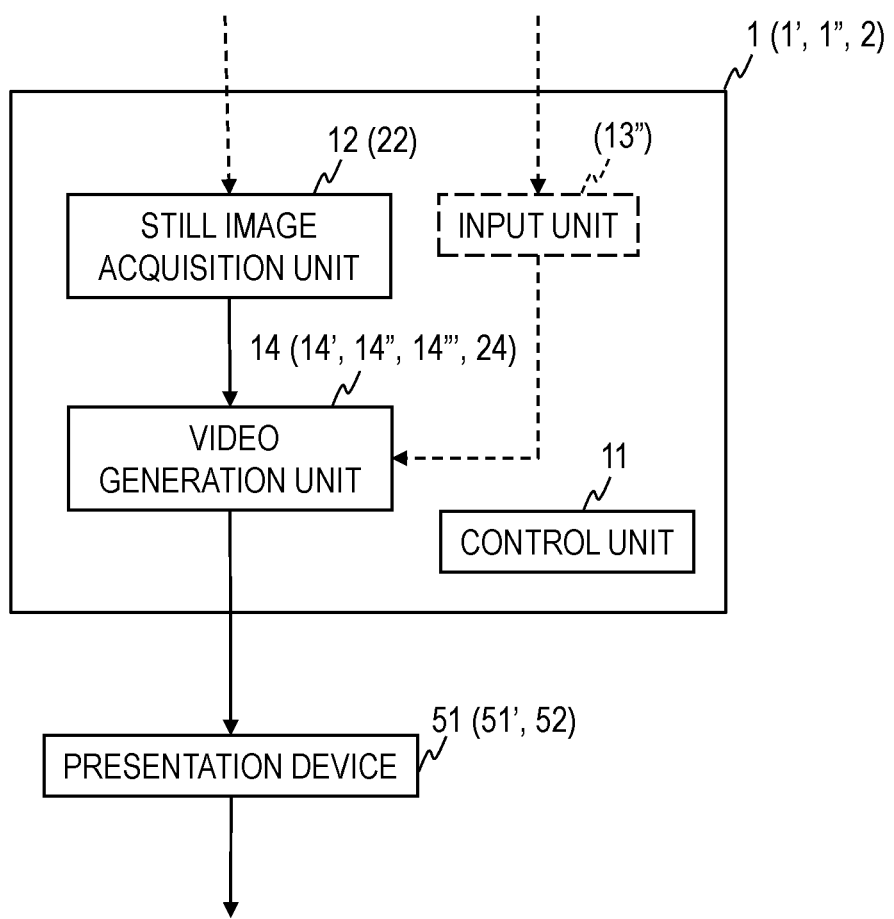
FIG. 1 is a block diagram exemplarily illustrating a functional configuration of a video generation device of an embodiment.

As exemplarily illustrated in FIG. 1, a video generation device 1 of the present embodiment includes a control unit 11, a still image acquisition unit 12, and a video generation unit 14, generates a video by performing processing under control of the control unit 11, and outputs the generated video to a presentation device 51. As exemplarily illustrated in FIG. 2A, the video generation unit 14 of the present embodiment includes an outline extraction unit 142, a striped-texture generation unit 143, and a synthesis unit 144.

<Still Image Acquisition Unit 12>

The still image acquisition unit 12 acquires a still image. The still image acquisition unit 12 may generate a predetermined still image, may generate a still image based on a condition (for example, shape, size, position, or luminance) input from the outside, may acquire a still image input from the outside, or may obtain a still image by capturing a real object. The shape of the still image is not limited but may be any shape in which the outline (edge) of the still image is a straight line or a curved line. The luminance of the still image is desirably uniform or substantially uniform. In other words, the still image desirably has no texture. This is because, with a texture, it appears as if only the outline moved (the vicinity of the texture stops). However, with a texture in the still image, it is possible to obtain an illusion effect to some extent.

<Video Generation Unit 14>

The still image obtained by the still image acquisition unit 12 is input to the video generation unit 14. Note that, inputting of an image or a video means inputting of information for specifying the image or the video. Similarly, outputting of an image or a video means outputting of information for specifying the image or the video. The video generation unit 14 generates and outputs a video including a stationary object region as a region of the input still image and a background region other than the stationary object region. However, the background region includes a striped-texture region adjacent to the outline of the stationary object region, and a striped texture having a striped luminance pattern (pattern including a luminance contour line) moves in a direction having a component orthogonal to the outline in the striped-texture region. The striped-texture region may be the entire background region or part of the background region. The striped luminance pattern is, for example, a pattern having a shape following the outline of the stationary object region (pattern including a luminance contour line in a shape following the outline of the stationary object region). The "shape following the outline" means a shape similar to the outline, a shape substantially similar to the outline, and a shape analogous to the outline. A specific example of processing at the video generation unit 14 will be described later. The visual system of a viewer of such a video integrates the moving striped texture presented in the background region with the stationary object region which is stationary. Accordingly, illusion is provided as if the still image in the stationary object region were moving. Since the moving striped texture is presented in the background region of the stationary object region, illusory motion can be provided to the stationary object region without visually changing the luminance and color of the stationary object region. Furthermore, the outline line of the stationary object region does not need to be physically changed. Moreover, the striped-texture region only need to be adjacent to the outline of the stationary object region, and the width of the stationary object region has no limitations, which leads to a high designing freedom. Specific examples of a video generated in this manner are described below with reference to FIGS. 4 to 13.

Video Example 1

Figure 4:
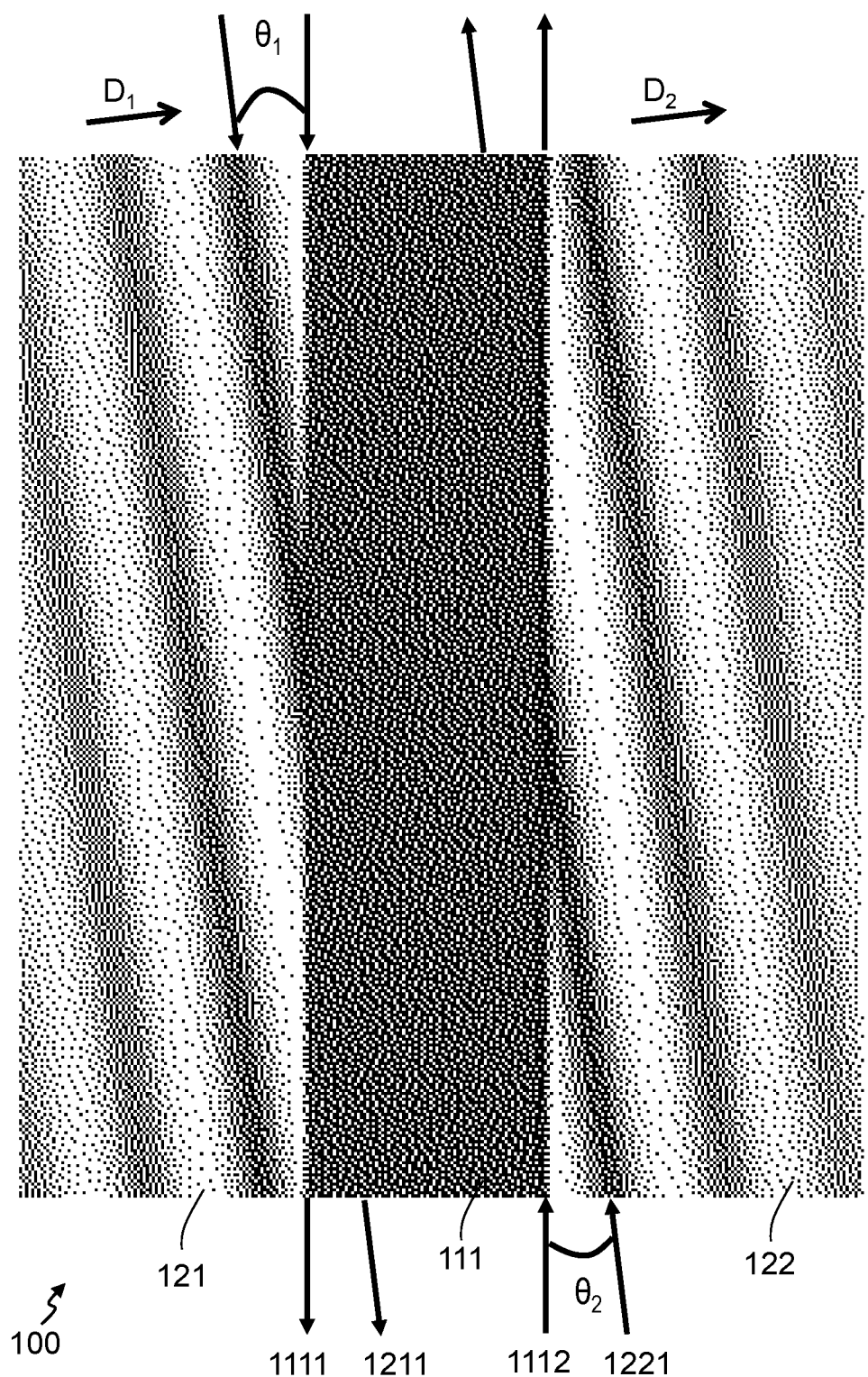
FIG. 4 is a diagram exemplarily illustrating a video generated in the embodiment.

For example, the video generation unit 14 generates and outputs a video 100 including a stationary object region 111 and background regions 121 and 122 other than the stationary object region 111 as exemplarily illustrated in FIG. 4. The background region 121 includes a striped-texture region adjacent to an outline 1111 of the stationary object region 111, and the background region 122 includes a striped-texture region adjacent to the outline 1112 of the stationary object region 111. In the example illustrated in FIG. 4, the entire background region 121 is a striped-texture region, and the entire background region 122 is a striped-texture region. In the striped-texture region of the background region 121, a striped texture having a luminance pattern in a shape following the outline 1111 moves in a direction $D_1$ having a component orthogonal to the outline 1111. In the striped-texture region of the background region 122, a striped texture having a luminance pattern in a shape following the outline 1112 moves in a direction $D_2$ having a component orthogonal to the outline 1112.

The striped texture having a luminance pattern in a shape following any of the outlines 1111 and 1112 is, for example, a texture in which luminance distribution in a shape following the outlines 1111 and 1112 is periodically repeated. In the example illustrated in FIG. 4, the outlines 1111 and 1112 are straight or substantially straight. In this case, the striped texture having a luminance pattern in a shape following any of the outlines 1111 and 1112 is, for example, a texture (for example, periodically repeated texture) that has luminance distribution in which the luminance is same on a straight line, the luminance distribution being repeated with the luminance continuously changed in a direction orthogonal or substantially orthogonal to the straight line. In other words, the striped texture in the background region 121 temporally changes with the luminance phase being continuously different among points in a direction orthogonal or substantially orthogonal to a straight line in a shape following the outline 1111. The striped texture in the background region 122 temporally changes with the luminance phase being continuously different among points in a direction orthogonal or substantially orthogonal to a straight line in a shape following the outline 1112. The luminance of the striped texture in the background region 121 continuously differs with continuous position difference in a direction having a component orthogonal to the outline 1111 (for example, direction orthogonal or substantially orthogonal to a straight line 1211 in a shape following the outline 1111). Similarly, the luminance of the striped texture in the background region 122 continuously differs with continuous position difference in a direction having a component orthogonal to the outline 1112 (for example, direction orthogonal or substantially orthogonal to a straight line 1221 in a shape following the outline 1112). For example, the luminance values of the striped textures in the background regions 121 and 122 have sin waveforms at positions in the directions.

The moving direction of the striped texture in the background region 121 (the direction $D_1$ having a component orthogonal to the outline 1111) is desirably orthogonal or substantially orthogonal to the straight line 1211 as a luminance contour line of the striped texture in a shape following the outline 1111. Similarly, the moving direction of the striped texture in the background region 122 (the direction $D_2$ having a component orthogonal to the outline 1112) is desirably orthogonal or substantially orthogonal to the straight line 1221 as a luminance contour line of the striped texture in a shape following the outline 1112. However, these conditions do not limit the present invention.

The luminance at the outline of the stationary object region 111 or in the vicinity of the outline of the stationary object region 111 is desirably between the upper and lower limits of the luminance of the striped texture in the background region 121 and between the upper and lower limits of the luminance of the striped texture in the background region 122. Accordingly, the above-described illusion can be more strongly perceived. However, even when this condition is not satisfied, the above-described illusion can be perceived as long as the difference between the luminance of the striped texture in each of the background regions 121 and 122 and the luminance at the outline of the stationary object region 111 or in the vicinity of the outline of the stationary object region 111 periodically changes. In any case, when the luminance in the background regions 121 and 122 in the vicinities of the outlines 1111 and 1112 of the stationary object region 111 is close to the luminance of the stationary object region 111, it is perceived as if the outlines 1111 and 1112 were pulled toward the background regions 121 and 122. Specifically, when the boundary between each of the outlines 1111 and 1112 and the corresponding one of the background regions 121 and 122 in the vicinities of the outlines 1111 and 1112 cannot be seen by the viewer in a lower spatial frequency band related to perception of image motion, it is perceived as if the outlines 1111 and 1112 were pulled toward the background regions 121 and 122. However, the spatial frequency band is affected by an individual difference such as eyesight.

It is desirable that the maximum value of the luminance of the striped texture in each of the background regions 121 and 122 is the luminance of white, and the minimum value of the luminance of the striped texture in each of the background regions 121 and 122 is the luminance of black. However, the maximum value of the luminance of the striped texture in each of the background regions 121 and 122 may be lower than the luminance of white, and the minimum value of the luminance of the striped texture in each of the background regions 121 and 122 may be higher than the luminance of black.

The angle between the striped texture in the background region 121 and the outline 1111 (angle between the straight line 1211 and the outline 1111) is represented by $\theta_1$, and the angle between the striped texture of the striped-texture region in the background region 122 and the outline 1112 (angle between the straight line 1221 and the outline 1112) is represented by $\theta_2$. The angles may satisfy $\theta_1 = \theta_2$ or $\theta_1 \neq \theta_2$.

A perceived visual effect differs with $\theta_1$, $\theta_2$, $D_1$, and $D_2$. For example, the striped textures in the background regions 121 and 122 move in directions perpendicular or substantially perpendicular to the outlines 1111 and 1112 of the stationary object region 111 (the right or left side in FIG. 4) when $\theta_1$ and $\theta_2$ are zero or close to zero, $D_1$ and $D_2$ are identical or approximate to each other, and the phases of the striped textures in the background regions 121 and 122 are identical or approximate to each other. Specifically, the phase of the luminance is identical or substantially identical between the background regions 121 and 122 in the vicinities of the outlines 1111 and 1112 (in other words, the luminance is identical or substantially identical between the background regions 121 and 122 in the vicinities of the outlines 1111 and 1112. The striped textures are positioned near the outlines 1111 and 1112 and parallel or substantially parallel to the outlines 1111 and 1112). In this case, it appears as if the stationary object region 111 swung to right and left. The spatial frequency of each striped texture is desirably at least 6.4 cycles per degree. However, a visual effect at a certain level occurs with the lower spatial frequency of the striped texture although the effect is lower. The moving speed of the striped texture is not restricted, but larger illusion can be perceived as the moving speed of the striped texture is higher. However, a too high moving speed of the striped texture potentially causes light-induced seizure, and thus the moving speed of the striped texture is desirably equal to or lower than 4 Hz.

The angles $\theta_1$ and $\theta_2$ may be larger or smaller than zero. In this case, the striped textures in the background regions 121 and 122 have luminance patterns tilted relative to tangent lines of the outlines 1111 and 1112 and move in directions tilted relative to the tangent lines of the outlines 1111 and 1112. When the striped textures are tilted relative to the outlines 1111 and 1112, it can be perceived as if the stationary object region 111 rippled (in particular, a visual effect that the outlines 1111 and 1112 deform as if rippling were provided). However, such a visual effect decreases when the absolute values of $\theta_1$ and $\theta_2$ are too large and the tilts are too large. Optimum values of the absolute values of $\theta_1$ and $\theta_2$ are equal to or larger than 1° and equal to or smaller than 4°. However, this does not limit the present invention. In addition, the visual effect can be more significantly perceived as the spatial frequencies (spatial frequencies in directions orthogonal or substantially orthogonal to the straight lines 1211 and 1221, respectively) of the striped textures in the background regions 121 and 122 are higher (strips are finer), but the visual effect more largely decreases as $\theta_1$ and $\theta_2$ increase. Thus, it is desirable to decrease the upper limit value of the absolute values of $\theta_1$ and $\theta_2$ as the spatial frequencies of the striped textures in the background regions 121 and 122 are higher. Specifically, it is desirable: when the striped texture in the background region 121 has a luminance pattern at a first spatial frequency, the upper limit of the tilt $\theta_1$ of the luminance pattern relative to the tangent line of the outline is a first upper limit value; when the striped texture in the background region 121 has a luminance pattern at a second spatial frequency, the upper limit of the tilt $\theta_1$ of the luminance pattern relative to the tangent line of the outline is a second upper limit value; the first spatial frequency is higher than the second spatial frequency; and the first upper limit value is smaller than the second upper limit value. Similarly, it is desirable: when the striped texture in the background region 122 has a luminance pattern at a first spatial frequency, the upper limit of the tilt $\theta_2$ of the luminance pattern relative to the tangent line of the outline is a first upper limit value; when the striped texture in the background region 122 has a luminance pattern at a second spatial frequency, the upper limit of the tilt $\theta_2$ of the luminance pattern relative to the tangent line of the outline is a second upper limit value; the first spatial frequency is higher than the second spatial frequency; and the first upper limit value is smaller than the second upper limit value. The effect is maximum when the spatial frequencies at parts where the stationary object region 111 contacts the striped textures in the background regions 121 and 122 are 0.5 cycles per degree. When the striped textures are tilted relative to the outlines 1111 and 1112, the moving speed of each striped texture is not restricted, but larger illusion can be perceived as the moving speed of the striped texture is higher. However, a too high moving speed of the striped texture potentially causes light-induced seizure, and thus the moving speed of the striped texture is desirably equal to or lower than 4 Hz.

FIGS. 5A to 8C exemplarily illustrate the video 100 in which the spatial frequencies and angles $\theta_1$ and $\theta_2$ of the striped textures are set as described below.

Figure 5A:
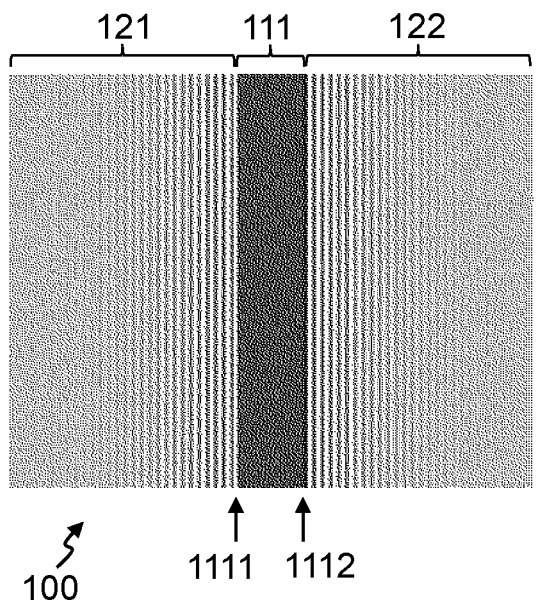
FIGS. 5A to 5D are diagrams exemplarily illustrating a video generated in the embodiment.

FIG. 5A: the wavelengths of the striped textures are 4 pixels and $\theta_1$ and $\theta_2$ are 0°.

Figure 5B:
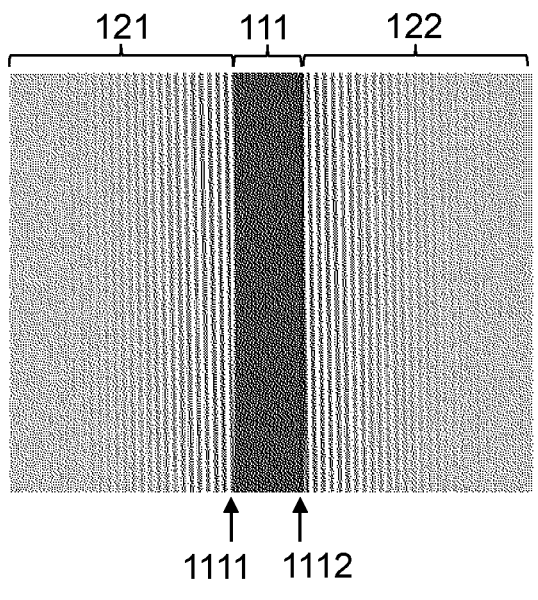

FIG. 5B: the wavelengths of the striped textures are 4 pixels and $\theta_1$ and $\theta_2$ are 1°.

Figure 5C:
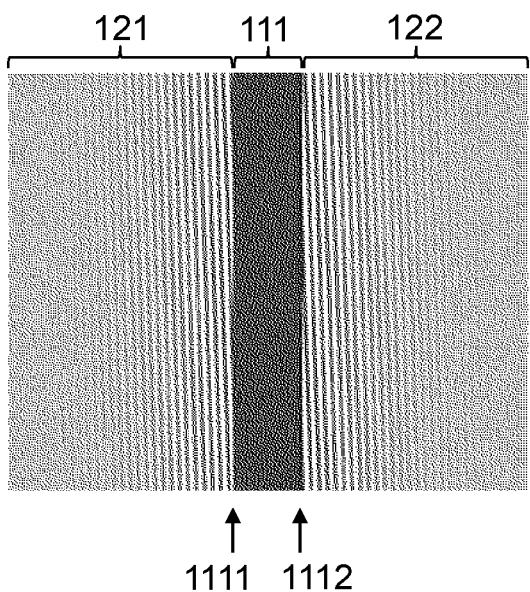

FIG. 5C: the wavelengths of the striped textures are 4 pixels and $\theta_1$ and $\theta_2$ are 2°.

Figure 5D:
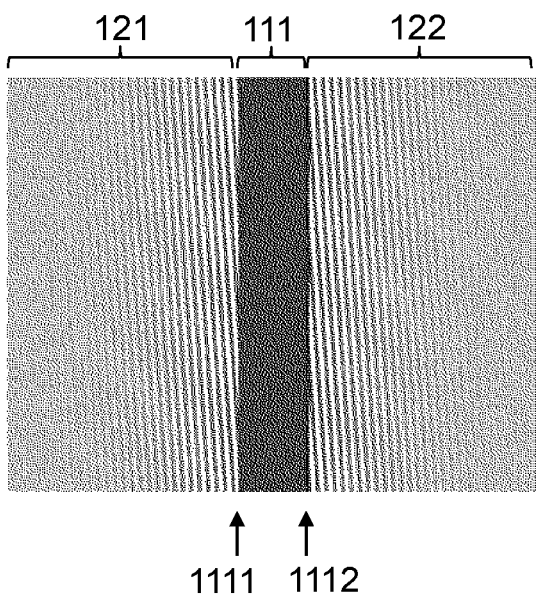

FIG. 5D: the wavelengths of the striped textures are 4 pixels and $\theta_1$ and $\theta_2$ are 4°.

Figure 6A:
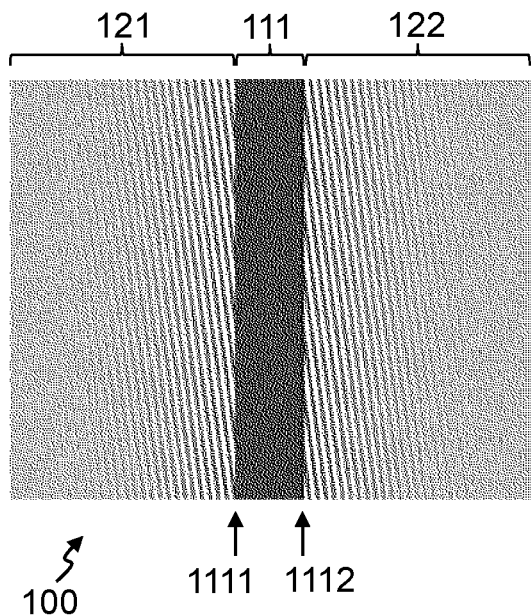
FIGS. 6A to 6D are diagrams exemplarily illustrating a video generated in the embodiment.

FIG. 6A: the wavelengths of the striped textures are 4 pixels and $\theta_1$ and $\theta_2$ are 8°.

Figure 6B:
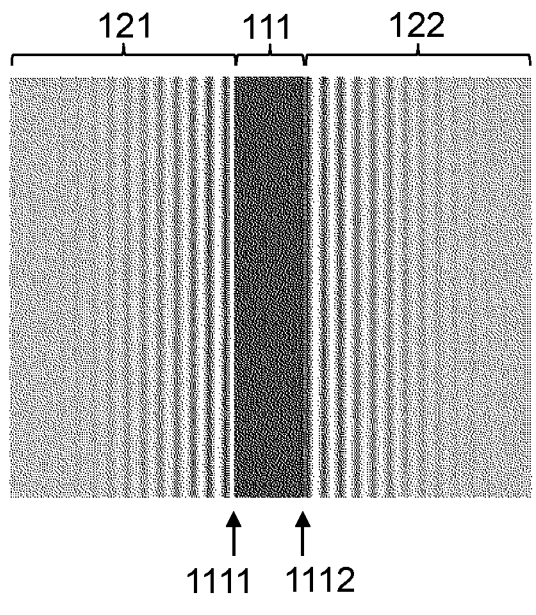

FIG. 6B: the wavelengths of the striped textures are 8 pixels and $\theta_1$ and $\theta_2$ are 0°.

Figure 6C:
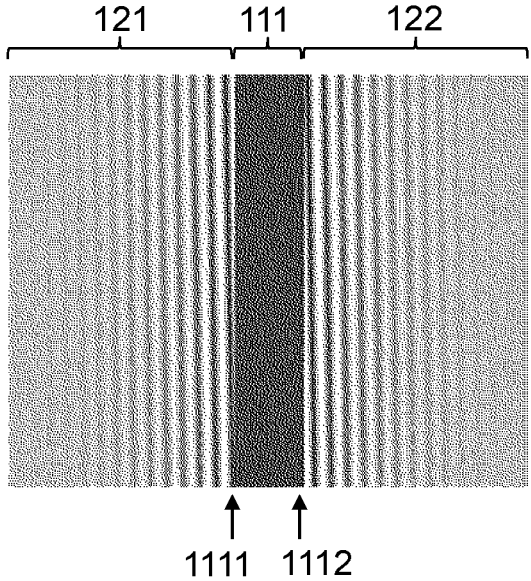

FIG. 6C: the wavelengths of the striped textures are 8 pixels and $\theta_1$ and $\theta_2$ are 1°.

Figure 6D:
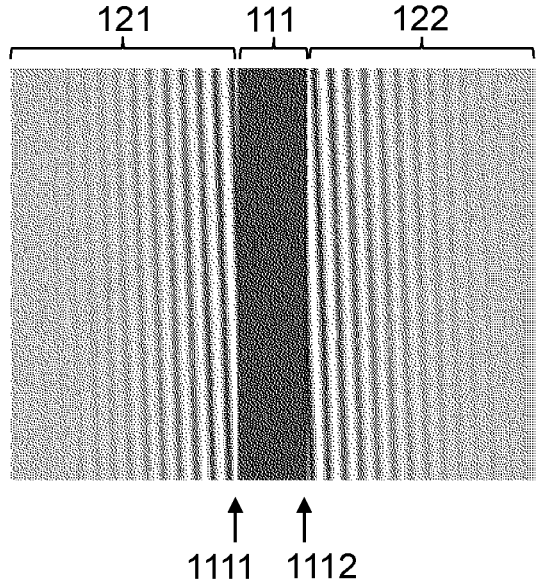

FIG. 6D: the wavelengths of the striped textures are 8 pixels and $\theta_1$ and $\theta_2$ are 2°.

Figure 7A:
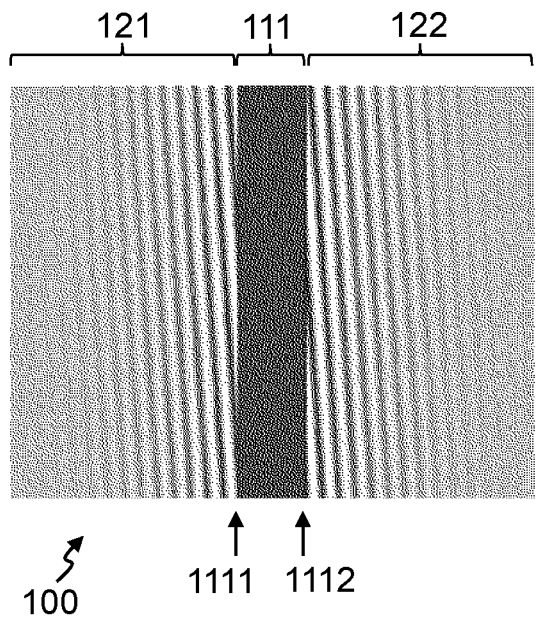
FIGS. 7A to 7D are diagrams exemplarily illustrating a video generated in the embodiment.

FIG. 7A: the wavelengths of the striped textures are 8 pixels and $\theta_1$ and $\theta_2$ are 4°.

Figure 7B:
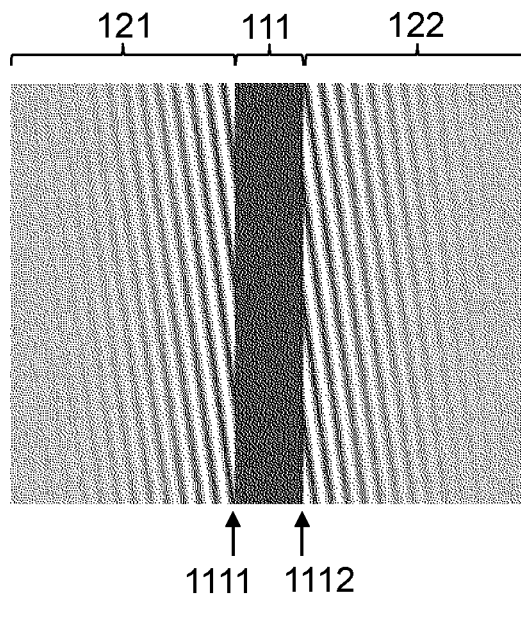

FIG. 7B: the wavelengths of the striped textures are 8 pixels and $\theta_1$ and $\theta_2$ are 8°.

Figure 7C:
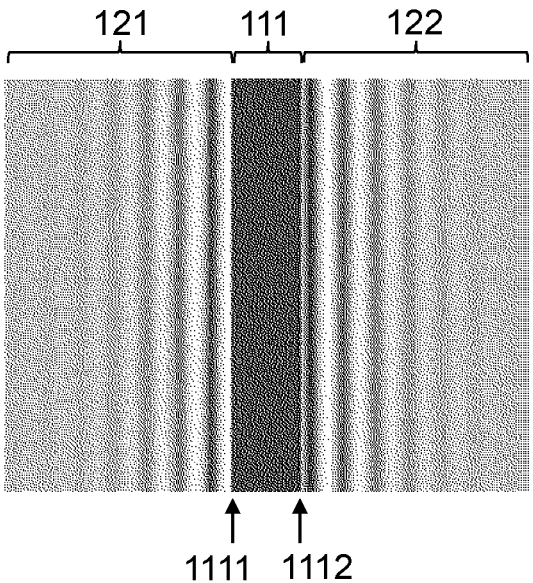

FIG. 7C: the wavelengths of the striped textures are 16 pixels and $\theta_1$ and $\theta_2$ are 0°.

Figure 7D:
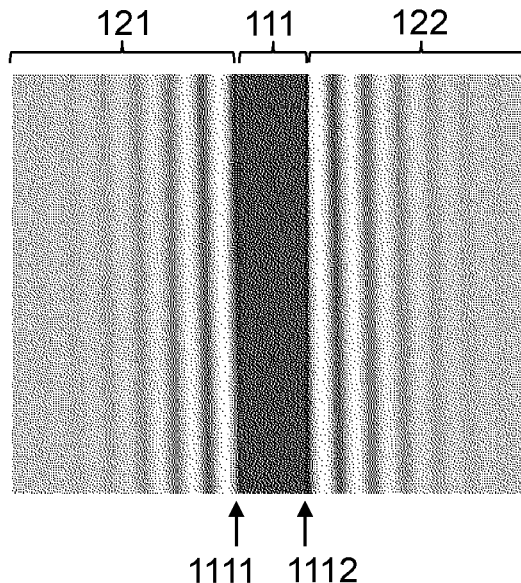

FIG. 7D: the wavelengths of the striped textures are 16 pixels and $\theta_1$ and $\theta_2$ are 1°.

Figure 8A:
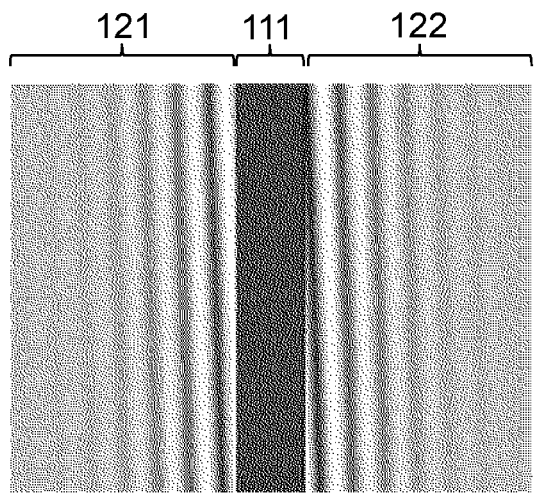
FIGS. 8A to 8C are diagrams exemplarily illustrating a video generated in the embodiment.

FIG. 8A: the wavelengths of the striped textures are 16 pixels and $\theta_1$ and $\theta_2$ are 2°.

Figure 8B:
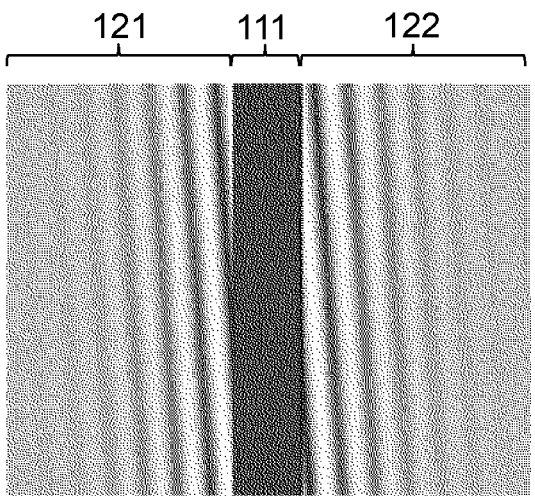

FIG. 8B: the wavelengths of the striped textures are 16 pixels and $\theta_1$ and $\theta_2$ are 4°.

Figure 8C:
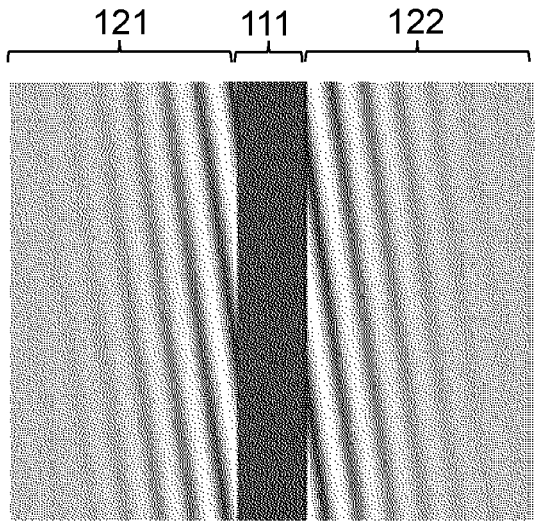

FIG. 8C: the wavelengths of the striped textures are 16 pixels and $\theta_1$ and $\theta_2$ are 8°.

Video Example 2

The striped-texture regions may be narrow regions adjacent to the outlines 1111 and 1112 of the stationary object region 111. Specifically, since illusion of the present embodiment uses the striped textures in the vicinity of the outlines 1111 and 1112 of the stationary object region 111, the striped-texture regions in which the luminance varies may be only in the vicinity of the outlines 1111 and 1112.

Figure 9:
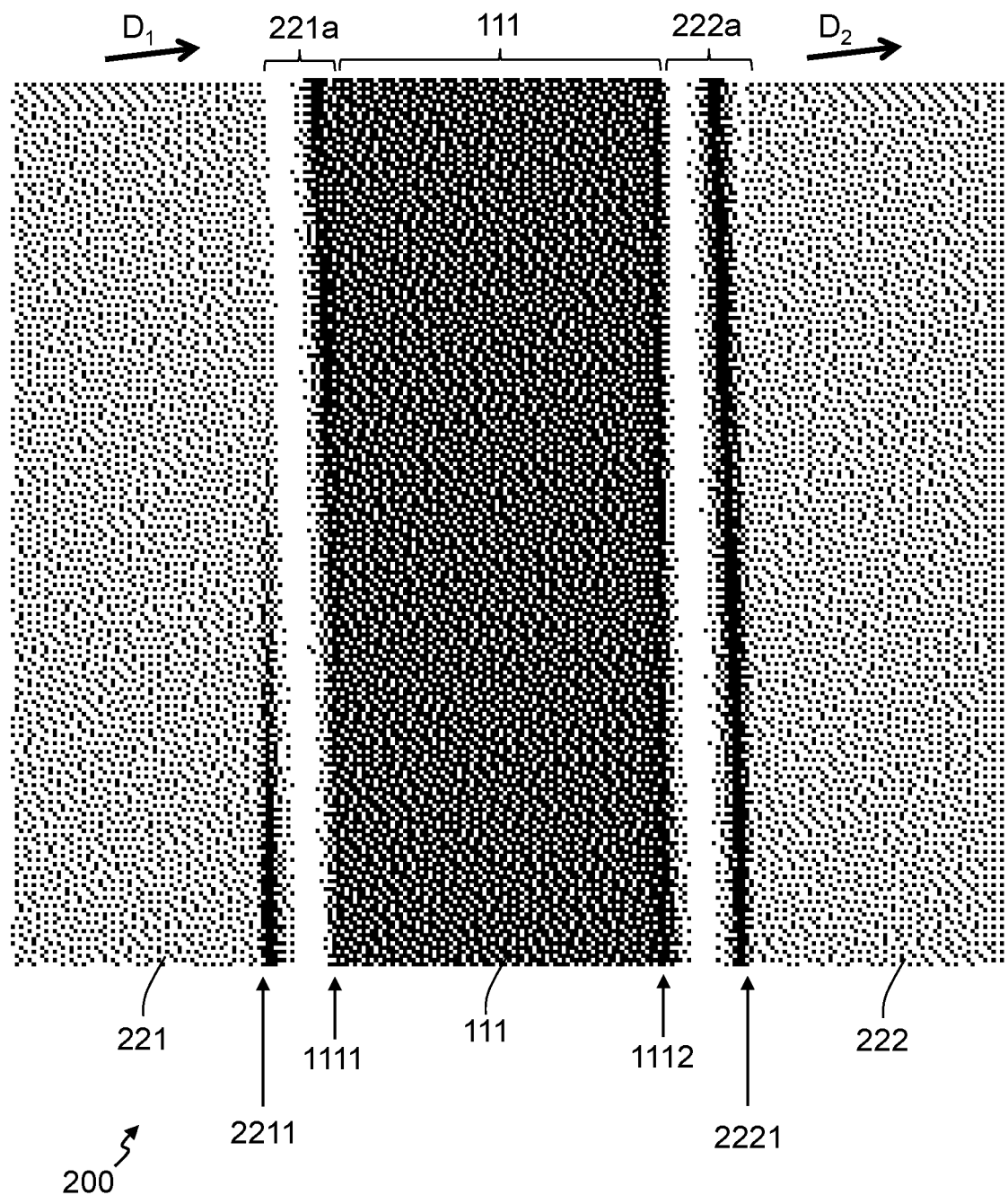
FIG. 9 is a diagram exemplarily illustrating a video generated in the embodiment.

For example, the video generation unit 14 may generate and output a video 200 including the stationary object region 111 and background regions 221 and 222 other than the stationary object region 111 as exemplarily illustrated in FIG. 9. The background region 221 includes a striped-texture region 221a (region sandwiched by the outline 1111 and a straight edge 2211 parallel to the outline 1111) adjacent to the outline 1111 of the stationary object region 111. The background region 222 includes a striped-texture region 222a (region sandwiched between the outline 1112 and a straight edge 2221 parallel to the outline 1112) adjacent to the outline 1112 of the stationary object region 111. A striped texture having a luminance pattern in a shape following the outline 1111 moves in the direction $D_1$ having a component orthogonal to the outline 1111 in the striped-texture region 221a of the background region 221. A striped texture having a luminance pattern in a shape following the outline 1112 moves in the direction $D_2$ having a component orthogonal to the outline 1112 in the striped-texture region 221a of the background region 222. The video 200 is same as the above-described example of the video 100 except that the striped-texture regions 221a and 222a of the video 200 are narrow regions adjacent to the outlines 1111 and 1112 of the stationary object region 111. In this manner, it is important that the striped-texture regions 221a and 222a contact the outlines 1111 and 1112 of the stationary object region 111, and the striped-texture regions 221a and 222a do not need to be across the entire background regions 221 and 222. Instead, a larger illusion effect is perceived when the striped-texture regions 221a and 222a are narrow. This is because when the striped-texture regions 221a and 222a are too wide, it is likely to be perceived as if the background of the stationary object region 111 were moving rather than as if the vicinity of the stationary object region 111 were moving. When the striped-texture regions 221a and 222a are too narrow, the striped textures are difficult to visually recognize, and accordingly, the illusion effect decreases. The striped-texture regions 221a and 222a are desirably regions as narrow as possible (regions having narrow widths in a direction orthogonal to the outlines 1111 and 1112) as long as the striped textures can be visually recognized. In this case, it is desirable that the striped textures of one period or more can be visually recognized in at least the striped-texture regions 221a and 222a.

Figure 10A:
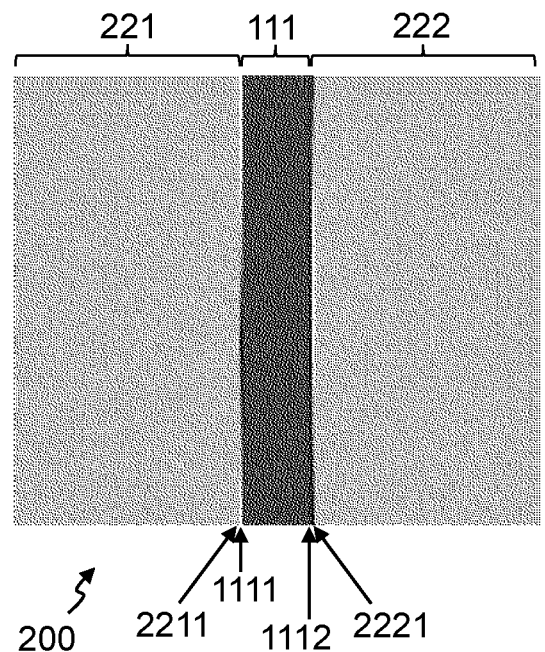
FIGS. 10A to 10D are diagrams exemplarily illustrating a video generated in the embodiment.
Figure 10B:
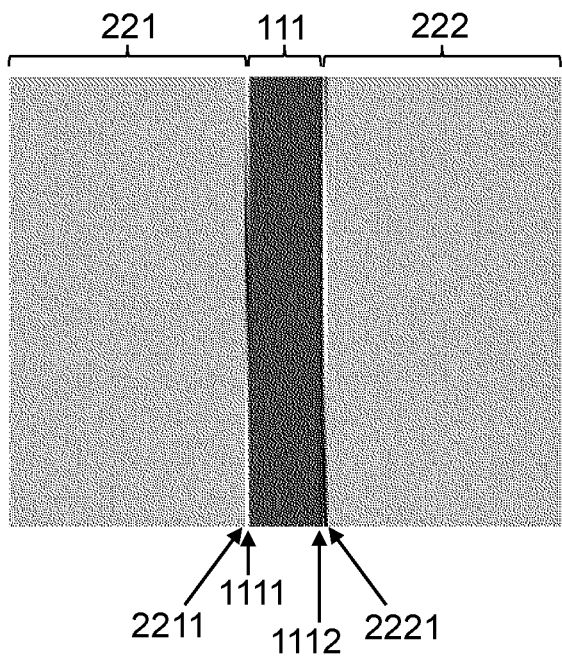
Figure 10C:
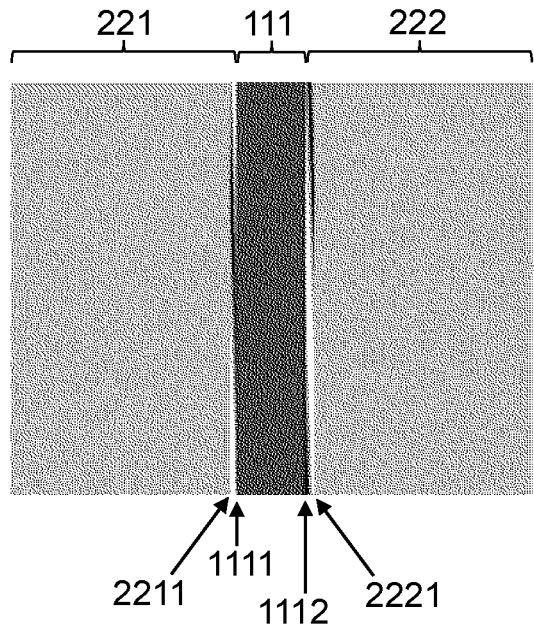
Figure 10D:
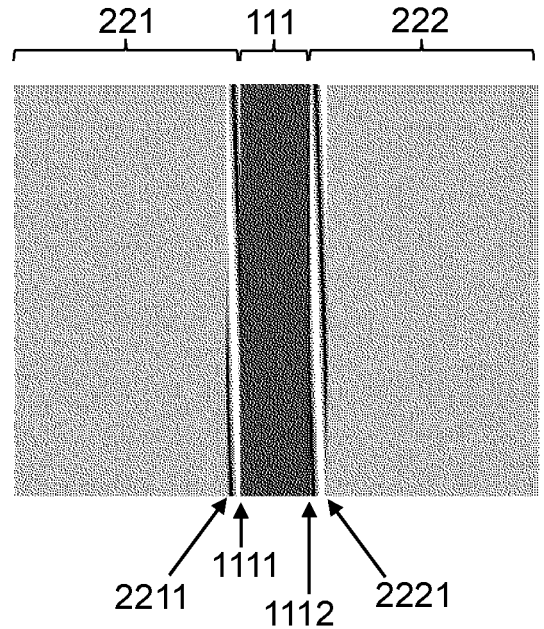
Figure 11:
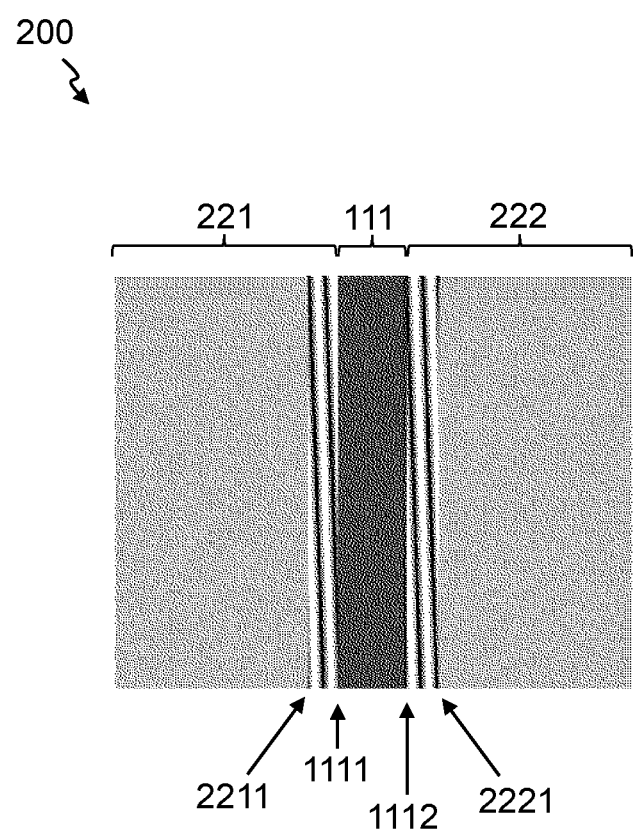
FIG. 11 is a diagram exemplarily illustrating a video generated in the embodiment.

FIGS. 10A to 11 exemplarily illustrate the video 200 in which the spatial frequencies and angles $\theta_1$ and $\theta_2$ of the striped textures are set as described below. Note that the "widths of the striped-texture regions 221a and 222a" means the widths of the striped-texture regions 221a and 222a in the direction orthogonal to the outlines 1111 and 1112.

FIG. 10A: the widths of the striped-texture regions 221a and 222a are each 1 pixel, the wavelengths of the striped textures are 8 pixels, and $\theta_1$ and $\theta_2$ are 2°.

FIG. 10B: the widths of the striped-texture regions 221a and 222a are each 2 pixels, the wavelengths of the striped textures are 4 pixels, and $\theta_1$ and $\theta_2$ are 2°.

FIG. 10C: the widths of the striped-texture regions 221a and 222a are each 4 pixels, the wavelengths of the striped textures are 4 pixels, and $\theta_1$ and $\theta_2$ are 2°.

FIG. 10D: the widths of the striped-texture regions 221a and 222a are each 8 pixels, the wavelengths of the striped textures are 4 pixels, and $\theta_1$ and $\theta_2$ are 2°.

FIG. 11: the widths of the striped-texture regions 221a and 222a are each 16 pixels, the wavelengths of the striped textures are 4 pixels, and $\theta_1$ and $\theta_2$ are 2°.

Video Example 3

Figure 12:
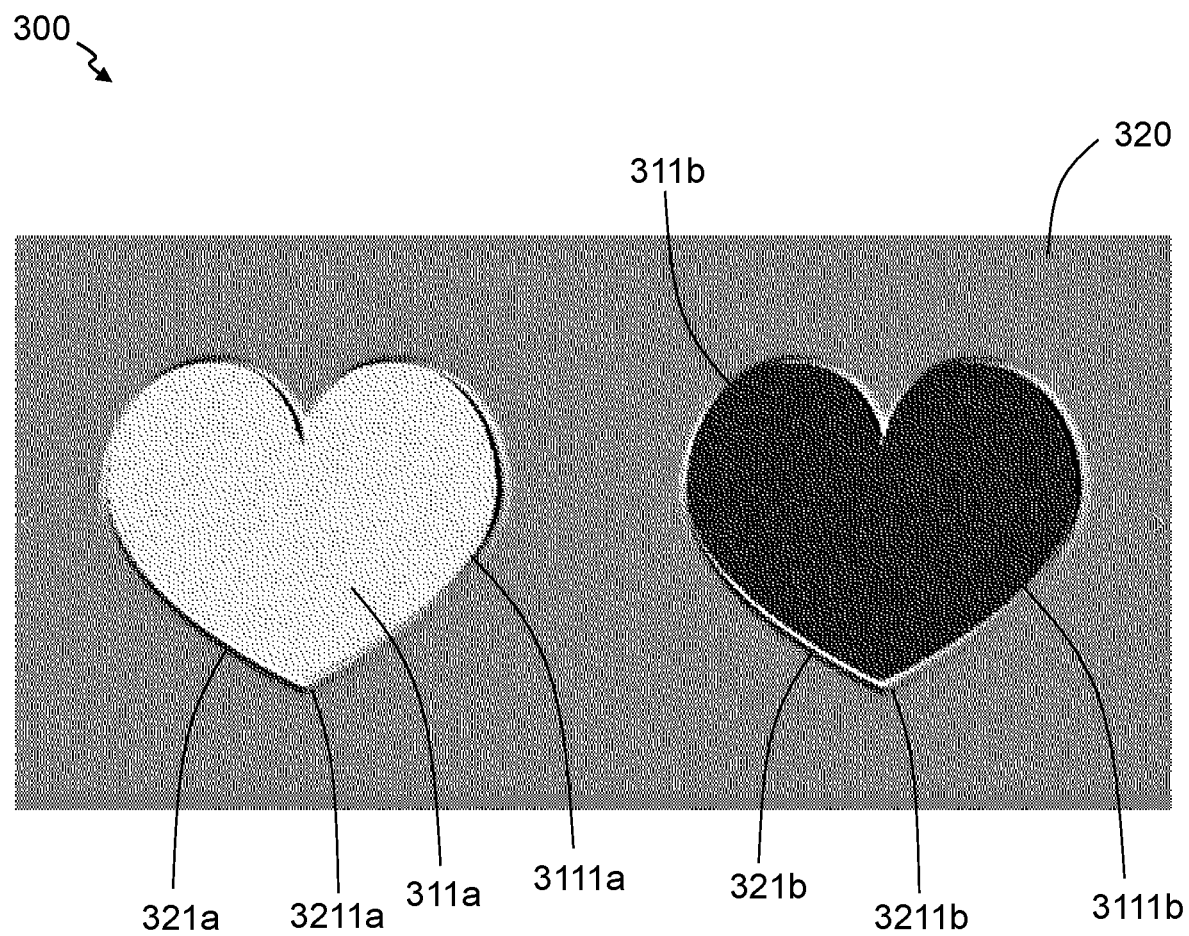
FIG. 12 is a diagram exemplarily illustrating a video generated in the embodiment.
Figure 13:
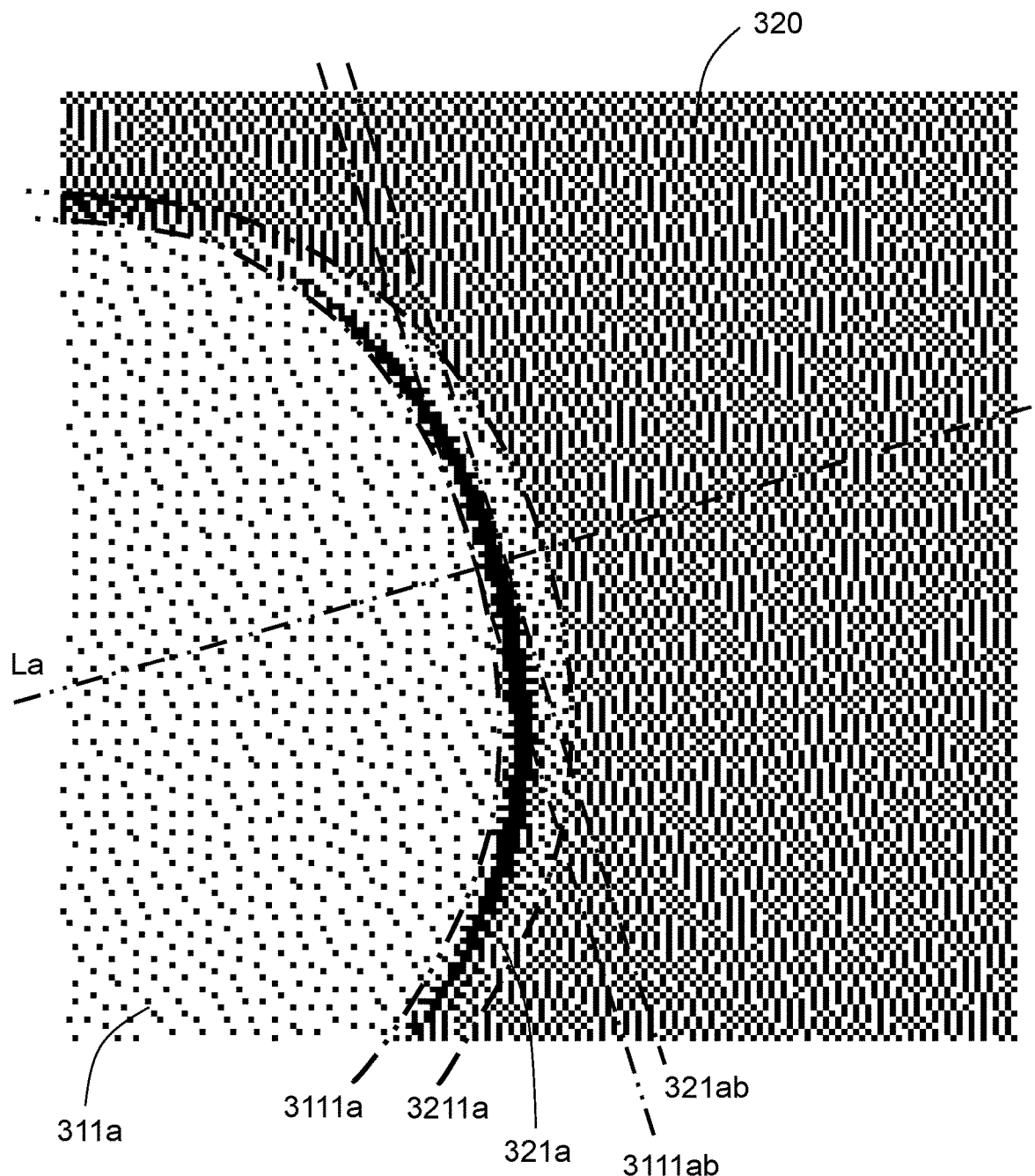
FIG. 13 is an enlarged view of FIG. 12.

The outline of the stationary object region may be a curved line. For example, the video generation unit 14 may generate and output a video 300 including stationary object regions 311a and 311b and a background region 320 other than the stationary object regions 311a and 311b as exemplarily illustrated in FIGS. 12 and 13. The background region 320 includes a striped-texture region 321a (region surrounded by the curved outline 3111a and a curved edge 3211a following the outline 3111a) adjacent to an outline 3111a of the stationary object region 311a, and a striped-texture region 321b (region surrounded by the curved outline 3111b and a curved edge 3211b following the outline 3111b) adjacent to an outline 3111b of the stationary object region 311b. A striped texture having a curved luminance pattern following the outline 3111a moves in a direction having a component orthogonal to the outline 3111a (component orthogonal to the tangent line of the outline 3111a) in the striped-texture region 321a. A striped texture having a curved luminance pattern following the outline 3111b moves in a direction having a component orthogonal to the outline 3111b (component orthogonal to the tangent line of the outline 3111b) in the striped-texture region 321b. The angle between a tangent line 3111ab of the outline 3111a and a tangent line 321ab of a luminance contour line of the striped texture in the striped-texture region 321a on a straight line La orthogonal to the tangent line 3111ab of the outline 3111a of the stationary object region 311a is represented by $\theta_1$ (FIG. 13). Similarly, the angle between a tangent line 3111bb of the outline 3111b and a tangent line 321bb of a luminance contour line of the striped texture in the striped-texture region 321b on a straight line Lb orthogonal to the tangent line 3111bb of the outline 3111b of the stationary object region 311b is represented by $\theta_2$. The angles $\theta_1$ and $\theta_2$ may be zero, smaller than zero, or larger than zero. The angles may satisfy $\theta_1 = \theta_2$ or $\theta_1 \neq \theta_2$. The video 300 is same as the above-described examples of the videos 100 and 200 except that the outlines 3111a and 3111b of the stationary object regions 311a and 311b of the video 300 are curved lines, the striped-texture regions 321a and 321b are narrow regions adjacent to the outlines 3111a and 3111b, and striped textures having curved luminance patterns following the outlines 3111*a* and 3111*b* move in the above-described direction in the striped-texture regions 321*a* and 321*b*. Note that FIG. 12 is an example in which the stationary object regions 311*a* and 311*b* have heart shapes, the widths (widths in a direction orthogonal to the outlines 3111*a* and 3111*b*) of the striped-texture regions 321*a* and 321*b* are each 8 pixels, the wavelengths of the striped textures are 8 pixels, and the angles $\theta_1$ and $\theta_2$ of the striped textures relative to the outlines 3111*a* and 3111*b* are 0°.

Video Example 4

In Video Examples 1 and 2, the phases and motion directions (angles $D_1$ and $D_2$) of the striped textures in the background regions 121, 122, 221, and 222 on the right and left sides of the stationary object region 111 may be able to be independently operated. For example, it can be presented as if the stationary object region 111 were scaled up and down or swung to right and left by independently operating the phases and motion directions of the striped textures in the background region 121 or 221 on the left side of the stationary object region 111 and the background region 122 or 222 on the right side thereof. For example, it is possible to generate illusion that the stationary object region 111 is scaled up and down when a striped texture moving to the left is presented in the background region 121 or 221 on the left side, a striped texture moving to the right is presented in the background region 122 or 222 on the right side, and the phases of these striped textures set to be identical. Moreover, it is possible to generate illusion that the stationary object region 111 is moving to right and left when a striped texture moving to the left is presented in the background region 121 or 221 on the left side, a striped texture moving to the right is presented in the background region 122 or 222 on the right side, and the phase difference between these striped textures are set closer to 180°. In addition, a plurality of striped-texture regions, the motion directions and phases of which can be independently operated may be provided in one background region (for example, the background region 121). The other feature is same as those in Video Examples 1 and 2.

Video Example 5

Video Examples 1 to 4 exemplarily describe striped textures each having a striped luminance pattern in a shape following the outline of a stationary object region. However, this does not limit the present invention. Specifically, the shape of the luminance pattern does not need to be a shape following the outline of the stationary object region as long as a striped texture in the background region has a striped luminance pattern (pattern including a luminance contour line). For example, the outline of the stationary object region may be a straight line and the luminance pattern of the striped texture may include a curved line, the outline of the stationary object region may be a curved line and the luminance pattern of the striped texture may include a straight line, or the outline of the stationary object region may be a curved line and the luminance pattern of the striped texture may be a curved line not similar to the outline of the stationary object region (curved line not in a shape following the outline). Alternatively, the outline of the stationary object region may include a straight line and a curved line and the luminance pattern of the striped texture may include a straight pattern and a curved pattern, the outline of the stationary object region may include a straight line and a curved line and the luminance pattern of the striped texture may include only a straight pattern, or the outline of the stationary object region may include a straight line and a curved line and the luminance pattern of the striped texture may include only a curved pattern.

<<Specific Example of Processing at Video Generation Unit 14>>

Figure 2A:
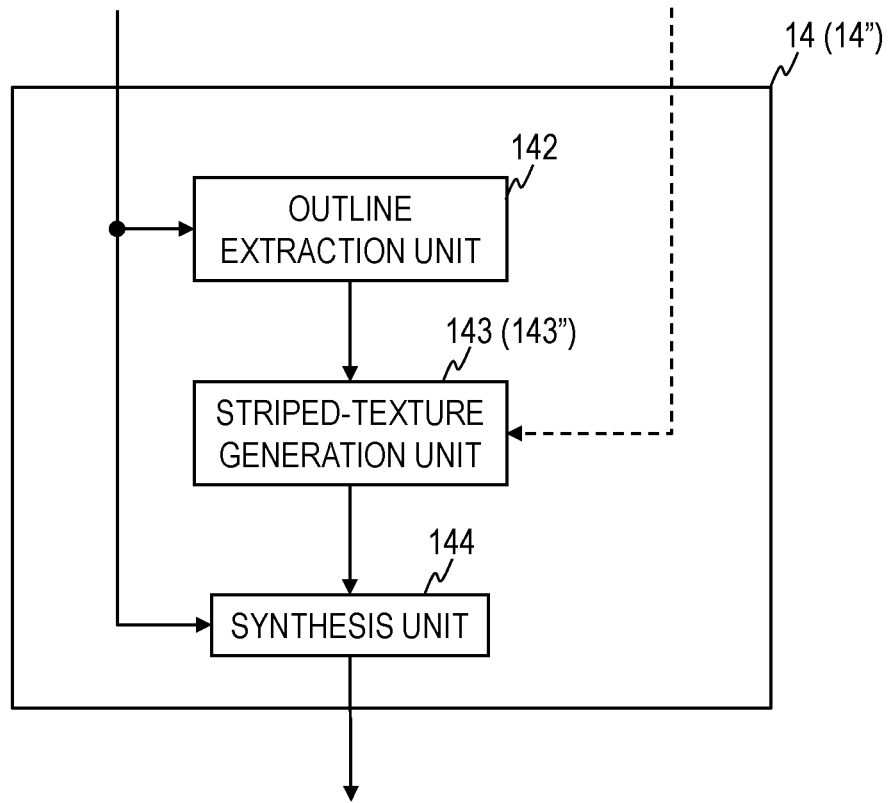
FIGS. 2A and 2B are block diagrams exemplarily illustrating a functional configuration of a video generation unit in FIG. 1.

A specific example of processing at the video generation unit 14 will be described below with reference to FIG. 2A.

A still image output from the still image acquisition unit 12 is input to the outline extraction unit 142 of the video generation unit 14. The outline extraction unit 142 extracts the outline of the input still image and outputs the extracted outline to the striped-texture generation unit 143. The striped-texture generation unit 143 sets, by using information of the outline of the input still image, a stationary object region that is a region of the still image and a background region that is a region other than the stationary object region as described above. In addition, the striped-texture generation unit 143 sets a striped-texture region in which a striped texture moves. Specifically, a partial region adjacent to the outline of the stationary object region may be set as the striped-texture region in the background region, or the entire background region may be set as the striped-texture region. In addition, the striped-texture generation unit 143 generates a video in which a striped texture moves by using predetermined striped texture information. For example, when the striped texture is a straight texture, information related to the luminance pattern (spatial frequency), luminance, contrast, angle relative to the stationary object region, motion direction, and speed of the striped texture is stored as the striped texture information in a non-illustrated storage unit in advance. The striped-texture generation unit 143 reads the striped texture information from the storage unit and generates a video in which the striped texture moves in the striped-texture region based on the read information.

(i) Case in which the Entire Background Region is the Striped-Texture Region

When the entire background region is the striped-texture region, the striped-texture generation unit 143 outputs, to the synthesis unit 144, a video that includes the stationary object region and the background region other than the stationary object region and in which a generated striped texture moves in the striped-texture region, in other words, in the background region. The synthesis unit 144 receives the still image and the video. The synthesis unit 144 generates and outputs a synthesis video obtained by synthesizing the still image in the stationary object region of the video.

(ii) Case in which Part of the Background Region is the Striped-Texture Region

The striped-texture generation unit 143 outputs, to the synthesis unit 144, a video that includes the stationary object region and the background region and in which a generated striped texture moves in the striped-texture region of the background region. The synthesis unit 144 receives the still image and the video that includes the stationary object region and the background region and in which the striped texture moves in the striped-texture region. The synthesis unit 144 generates and outputs a synthesis video obtained by synthesizing the still image in the stationary object region of the video.

Note that although the above description assumes that the striped-texture information is provided in advance, the striped-texture information may be generated based on the outline obtained by the outline extraction unit. The striped-texture information may be generated by any method as long as a striped-texture video described above in each <Video Example> can be generated based on the striped-texture information.

For example, there are exemplary combinations of the outline shape of the stationary object region and the luminance pattern shape of the striped texture as follows.

- The outline of the stationary object region is a straight line, and the luminance contour line of the luminance pattern of the striped texture is a straight line tilted relative to the outline of the stationary object region
- The outline of the stationary object region is a straight line, and the luminance contour line of the luminance pattern of the striped texture is a curved line
- The outline of the stationary object region is a curved line, and the luminance contour line of the luminance pattern of the striped texture is a curved line similar or substantially similar to the outline of the stationary object region
- The outline of the stationary object region is a curved line, and the luminance contour line of the luminance pattern of the striped texture is a curved line not similar nor substantially similar to the outline of the stationary object region (for example, the luminance contour line of the luminance pattern of the striped texture is a curved line similar or substantially similar to the outline of the stationary object region and tilted relative to the outline of the stationary object region)

<Presentation Device 51>

The presentation device 51 receives a synthesis video output from the video generation unit 14. The presentation device 51 presents the synthesis video. For example, the presentation device 51 may display the synthesis video on a display (smartphone display or VR head-mounted display), may display the synthesis video on a smart glass, or may project the synthesis video on a screen.

[Modification 1 of First Embodiment]

Modification 1 of the first embodiment is a modification of the first embodiment and different from the first embodiment in that a video including a stationary object region and a background region is presented without being digitally synthesized with a still image. The other feature is same as that of the first embodiment. Hereinafter, difference from a matter described so far will be mainly described, an already described matter is denoted by the same reference number, and description thereof will be simplified.

As exemplarily illustrated in FIG. 1, a video generation device 1' of the present modification includes the control unit 11, the still image acquisition unit 12, and a video generation unit 14', generates a video by performing processing under control of the control unit 11, and outputs the generated video to the presentation device 51'. As exemplarily illustrated in FIG. 2B, the video generation unit 14' of the present embodiment includes the outline extraction unit 142 and a striped-texture generation unit 143'.

<Still Image Acquisition Unit 12>

The same description as in the first embodiment applies.

<Video Generation Unit 14'>

The video generation unit 14' generates and outputs a video including a stationary object region that is a region of an input still image and a background region other than the stationary object region. The video generation unit 14' is different from the video generation unit 14 only in that the video generation unit 14' does not synthesize the still image in the stationary object region.

<<Specific Example of Processing at Video Generation Unit 14'>>

Figure 2B:
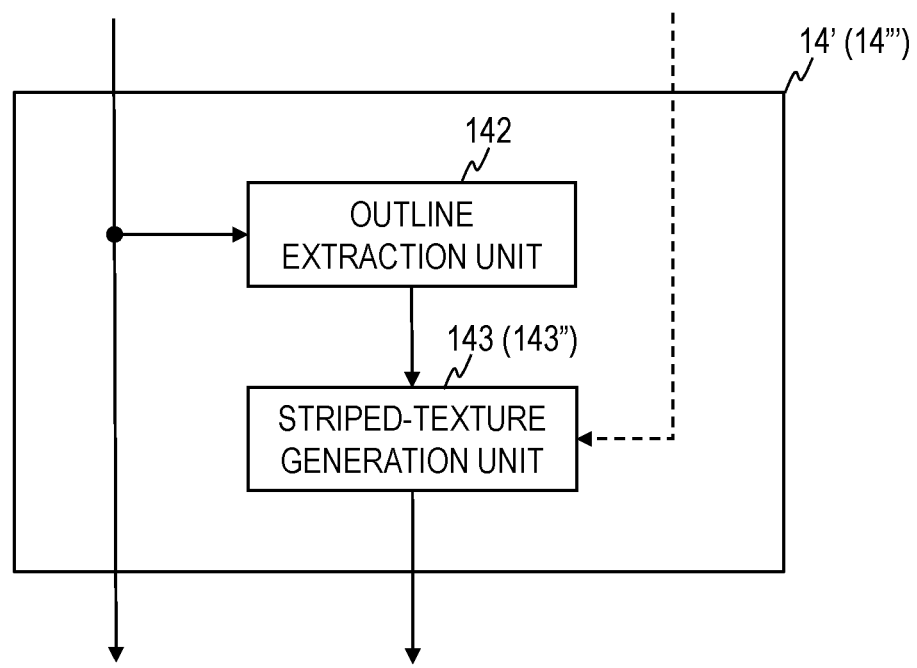

Processing at the video generation unit 14' will be described below with reference to FIG. 2B.

A still image output from the still image acquisition unit 12 is input to the outline extraction unit 142 of the video generation unit 14'. The outline extraction unit 142 extracts the outline of the input still image and outputs the extracted outline to the striped-texture generation unit 143. The striped-texture generation unit 143 sets a stationary object region that is a region of the still image and a background region other than the stationary object region by using information of the outline of the input still image as described above. In addition, the striped-texture generation unit 143 sets a striped-texture region in which a striped texture moves. Specifically, a partial region adjacent to the outline of the stationary object region in the background region may be set as the striped-texture region, or the entire background region may be set as the striped-texture region. In addition, the striped-texture generation unit 143 generates a video in which a striped texture moves by using predetermined striped-texture information.

(i) Case in which the Entire Background Region is the Striped-Texture Region

When the entire background region is the striped-texture region, the striped-texture generation unit 143 outputs a video that includes the stationary object region and the background region other than the stationary object region and in which a generated striped texture moves in the striped-texture region, in other words, in the background region.

(ii) Case in which Part of the Background Region is the Striped-Texture Region

The striped-texture generation unit 143 outputs a video that includes the stationary object region and the background region and in which a generated striped texture moves in the striped-texture region of the background region.

The striped-texture generation unit 143 outputs the video that includes the stationary object region and the background region to the presentation device 51'. In addition, the still image is output to the presentation device 51'.

<Presentation Device 51'>

The presentation device 51' receives the video and the still image output from the video generation unit 14'. The presentation device 51' displays the video and the still image on different planes so that the still image overlaps the stationary object region. For example, one of the still image and the stationary object region is displayed on a display, and the other is displayed on a transmissive display disposed between the display and the viewer. Accordingly, the viewer can see an image in which the still image overlaps the stationary object region of the video.

[Modification 2 of First Embodiment]

Modification 2 of the first embodiment is a modification of the first embodiment or Modification 1 of the first embodiment and different from the first embodiment or Modification 1 of the first embodiment in that a striped-texture region and/or striped-texture information is set based on input information. The other feature is same as that of the first embodiment or Modification 1 of the first embodiment.

As exemplarily illustrated in FIG. 1, a video generation device 1" includes the control unit 11, the still image acquisition unit 12, an input unit 13", and a video generation unit 14" (or video generation unit 14'") of the present modification, generates a video by performing processing under control of the control unit 11, and outputs the generated video to the presentation device 51 (or 51'). As exemplarily illustrated in FIG. 2A, the video generation unit 14" of the present embodiment includes the outline extraction unit 142, a striped-texture generation unit 143", and the synthesis unit 144. As exemplarily illustrated in FIG. 2B, the video generation unit 14''' of the present embodiment includes the outline extraction unit 142 and the striped-texture generation unit 143".

<Still Image Acquisition Unit 12>

The same description as in the first embodiment applies.

<Input Unit 13">

Setting information necessary for setting a striped-texture region, and/or striped-texture information is input to the input unit 13". Examples of the setting information include the range and shape of the striped-texture region, and examples of the striped-texture information include the luminance pattern (spatial frequency) of a striped texture, the angle of the striped texture relative to a stationary object region, the motion direction and speed of the striped texture, and information indicating how the stationary object region is to be presented. Examples of the information indicating how the stationary object region is to be presented include information indicating that the stationary object region is to be presented as if the stationary object region swung to right and left, as if the stationary object region rippled, as if the stationary object region were scaled up and down, and as if the stationary object region expanded and contracted. When no setting information necessary for setting a striped-texture region is input or when the input setting information does not match the "information indicating how the stationary object region is to be presented", a striped-texture region for generating intended illusion may be set based on the information indicating how the stationary object region is to be presented. The method of the setting and the method of determining whether the input setting information matches the "information indicating how the stationary object region is to be presented" are as described above.

A still image and setting information necessary for setting a striped-texture region are input to the video generation unit 14" (or the video generation unit 14'''). The video generation unit 14" (or the video generation unit 14''') generates, based on the setting information, a video including a stationary object region that is a region of the input still image and a background region other than the stationary object region, and outputs the generated video.

<<Specific Example of Processing at Video Generation Unit 14">>

Processing at the video generation unit 14" will be described below with reference to FIG. 2A.

A still image output from the still image acquisition unit 12 is input to the outline extraction unit 142 of the video generation unit 14". The outline extraction unit 142 extracts the outline of the input still image and outputs the extracted outline to the striped-texture generation unit 143. The striped-texture generation unit 143" sets a stationary object region that is a region of the still image and a background region other than the stationary object region as described in the first embodiment by using input setting information and information of the outline of the still image. The striped-texture generation unit 143" also sets a striped-texture region in which a striped texture moves as described in the first embodiment. However, the striped-texture region has characteristics specified by the setting information. The other feature is same as that of the video generation unit 14 of the first embodiment.

<<Specific Example of Processing at Video Generation Unit 14'''>>

Processing at the video generation unit 14''' will be described below with reference to FIG. 2B.

A still image output from the still image acquisition unit 12 is input to the outline extraction unit 142 of the video generation unit 14'''. The outline extraction unit 142 extracts the outline of the input still image and outputs the extracted outline to the striped-texture generation unit 143". The striped-texture generation unit 143" sets a stationary object region that is a region of the still image and a background region other than the stationary object region as described above by using information of the outline of the input still image. The striped-texture generation unit 143" also sets a striped-texture region in which a striped texture moves. However, the striped-texture region has characteristics specified by setting information. The other feature is same as that of the video generation unit 14' of Modification 1 of the first embodiment.

<Presentation Device 51 (or Presentation Device 51')>

The same description as in the first embodiment or Modification 1 of the first embodiment applies.

Second Embodiment

When a stationary object that is a real object is disposed in a stationary object region, a video that provides motion illusion to the stationary object may be generated. The real object is, for example, a stereoscopic or planar object made of paper, wood, metal, or other material.

As exemplarily illustrated in FIG. 1, a video generation device 2 of the present embodiment includes the control unit 11, a still image acquisition unit 22, and a video generation unit 24, generates a video by performing processing under control of the control unit 11, and outputs the generated video to the presentation device 51. As exemplarily illustrated in FIG. 3, the video generation unit 24 of the present embodiment includes the outline extraction unit 142 and the striped-texture generation unit 143 (or 143").

<Still Image Acquisition Unit 22>

The still image acquisition unit 22 obtains a still image of a stationary object that is a real object by capturing the stationary object and outputs the obtained still image.

<Video Generation Unit 24>

Figure 3:
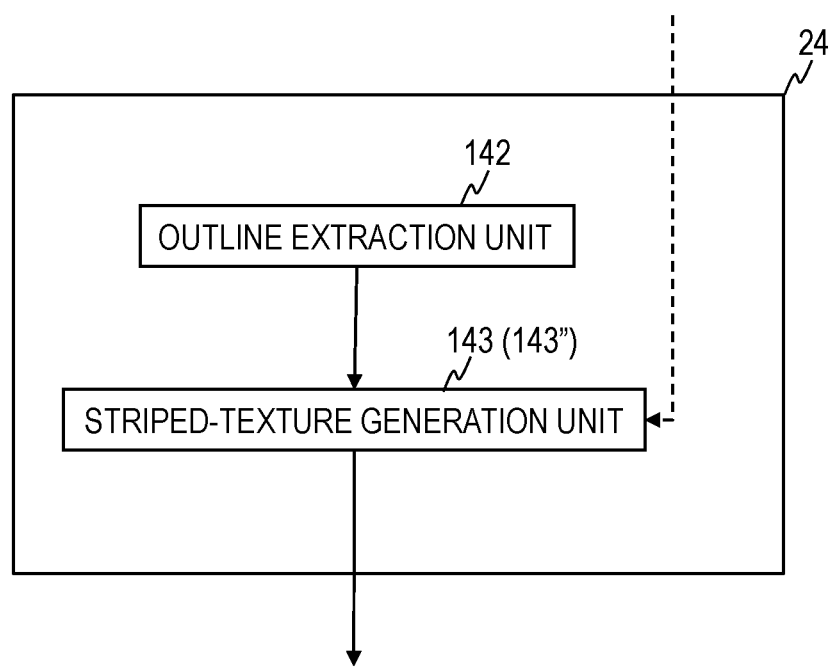
FIG. 3 is a block diagram exemplarily illustrating a functional configuration of the video generation unit in FIG. 1.

The video generation unit 24 receives the still image output from the still image acquisition unit 22. The video generation unit 24 generates, by using the still image, a video including a background region as the background of a region in which a stationary object is disposed, and outputs the generated video. The background region includes a striped-texture region adjacent to the outline of a stationary object region, and a striped texture moves in a direction having a component orthogonal to the outline in the striped-texture region. The striped texture has, for example, a luminance pattern in a shape following the outline, but is not limited thereto. Processing at the video generation unit 24 is same as in Modification 1 of the first embodiment or a modification of Modification 1 in accordance with Modification 2 of the first embodiment except that the region in which the stationary object is disposed is set as the stationary object region and a still image is not output to the presentation device 51' (FIG. 3). When the striped texture does not have a luminance pattern in a shape following the outline, the region in which the stationary object is disposed does not necessarily need to be set as the stationary object region. Note that although the above description assumes that striped-texture information is provided in advance, the striped-texture information may be generated based on the still image captured by the still image acquisition unit. The striped-texture information may be generated by any method as long as a striped-texture video described above in each <Video Example> is generated based on the striped-texture information.

The presentation device 51 receives the video output from the video generation unit 24. The presentation device 51 presents the video. For example, the presentation device 51 displays the video on a display. As described above, the displayed video includes the stationary object region and the background region other than the stationary object region. When the stationary object region is set, the above-described stationary object is disposed in the stationary object region to provide a visual effect as if the stationary object were moving. When the striped texture does not have a luminance pattern in a shape following the outline, the stationary object may be disposed at any position where at least part of the stationary object contacts the inside of the striped-texture region.

[Hardware Configuration]

The video generation devices 1, 1', 1", and 2 in the embodiments and modifications are each a device configured, for example, when a general-purpose or dedicated computer including a processor (hardware processor) such as a central processing unit (CPU), and a memory such as a random-access memory (RAM) or a read-only memory (ROM) executes a predetermined program. The computer may include one processor and one memory or may include a plurality of processors and a plurality of memories. The program may be installed on the computer or may be recorded in a ROM or the like in advance. Some or all processing units may be configured by using an electronic circuitry that achieves a processing function alone instead of an electronic circuitry, such as a CPU, that achieves a functional configuration by reading a program. An electronic circuitry included in one device may include a plurality of CPUs.

Figure 14:
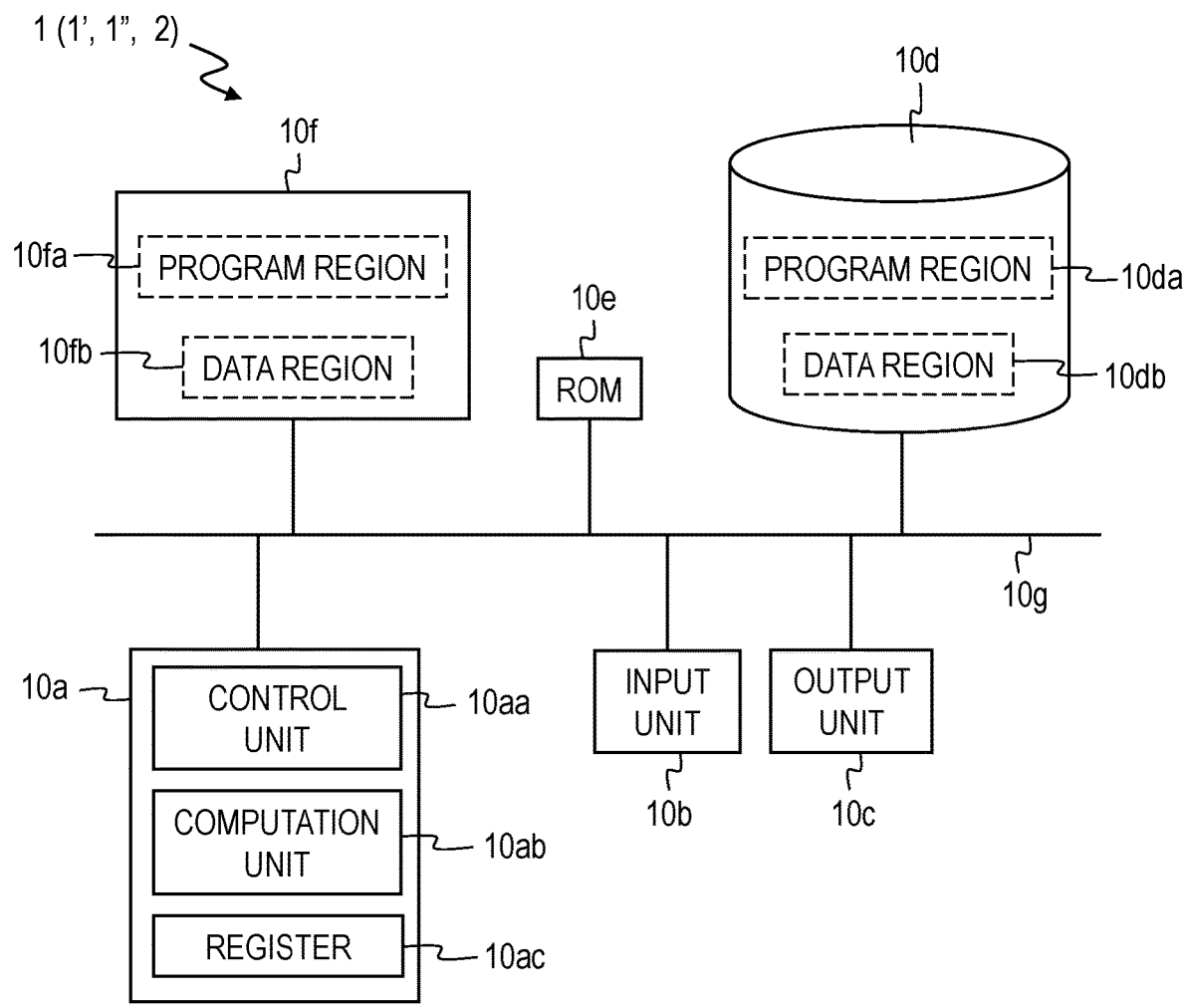
FIG. 14 is a diagram exemplarily illustrating a hardware configuration of the video generation device of the embodiment.

FIG. 14 is a block diagram exemplarily illustrating a hardware configuration of each of the video generation devices 1, 1', 1", and 2 in the embodiments. As exemplarily illustrated in FIG. 14, the video generation devices 1, 1', 1", and 2 of this example each include a central processing unit (CPU) 10a, an input unit 10b, an output unit 10c, a random access memory (RAM) 10d, a read only memory (ROM) 10e, an auxiliary storage device 10f, and a bus 10g. The CPU 10a of this example includes a control unit 10aa, a computation unit 10ab, and a register 10ac and executes various kinds of arithmetic processing in accordance with various programs read onto the register 10ac. The input unit 10b is an input terminal, a keyboard, a mouse, a touch panel, or the like through which data is input. The output unit 10c is an output terminal, a display, a LAN card controlled by the CPU 10a having read a predetermined program, or the like through which data is output. The RAM 10d is a static random access memory (SRAM), a dynamic random access memory (DRAM), or the like and has a program region 10da in which a predetermined program is stored and a data region 10db in which various kinds of data is stored. The auxiliary storage device 10f is, for example, a hard disk, a magneto-optical disc (MO), or a semiconductor memory and has a program region 10fa in which a predetermined program is stored and a data region 10fb in which various kinds of data is stored. The bus 10g connects the CPU 10a, the input unit 10b, the output unit 10c, the RAM 10d, the ROM 10e, and the auxiliary storage device 10f to enable information communication therebetween. The CPU 10a writes a program stored in the program region 10fa of the auxiliary storage device 10f to the program region 10da of the RAM 10d in accordance with a read operating system (OS) program. Similarly, the CPU 10a writes various kinds of data stored in the data region 10fb of the auxiliary storage device 10f to the data region 10db of the RAM 10d. Then, addresses on the RAM 10d where the program and the data are written are stored to the register 10ac of the CPU 10a. The control unit 10aa of the CPU 10a sequentially reads these addresses stored in the register 10ac, reads the program and the data from regions on the RAM 10d indicated by the read addresses, causes the computation unit 10ab to sequentially execute computation indicated by the program, and stores a result of the computation in the register 10ac. With such a configuration, the functional configurations of the video generation devices 1, 1', 1", and 2 are achieved.

The above-described program may be recorded in a computer-readable recording medium. The computer-readable recording medium is, for example, a non-transitory recording medium. Examples of such a recording medium include a magnetic recording device, an optical disk, a magneto-optical recording medium, and a semiconductor memory.

The program is distributed by, for example, selling, trading, or lending a portable recording medium such as a DVD or a CD-ROM in which the program is recorded. Alternatively, the program may be distributed by storing the program in a storage device of a server computer and forwarding the program from the server computer to another computer through a network. As described above, for example, a computer that executes such a program first temporarily stores, in an own storage device, the program recorded in the portable recording medium or forwarded from the server computer. Then, at processing execution, the computer reads the program stored in the own storage device and executes processing in accordance with the read program. Alternatively, as another execution form of the program, the computer may directly read the program from the portable recording medium and execute processing in accordance with the program, or may sequentially execute processing in accordance with a received program each time the program is forwarded from the server computer to the computer. Alternatively, the above-described processing may be executed through what is called an application service provider (ASP) service in which the program is not forwarded from the server computer to the computer and a processing function is achieved only with program execution instruction and result acquisition. Note that the program in the present form includes information that is used for processing by an electronic calculator and equivalent to a program (not a direct command to the computer but data or the like having a property that defines processing at the computer).

In each embodiment, the video generation device is configured by executing predetermined programs on a computer, but at least part of their processing contents may be achieved with hardware.

Note that the present invention is not limited to the above-described embodiments. For example, in the second embodiment, the still image acquisition unit 22 obtains a still image of a stationary object that is a real object by capturing the stationary object and outputs the obtained still image. However, a stationary object region in which the stationary object is disposed is known when the stationary object is known, and thus the still image acquisition unit 22 may be omitted. In this case, the video generation unit 24 may generate, without using the still image, a video including a background region as the background of the known stationary object region and may output the generated video. The above-described various processing may be not only executed in a temporally sequential manner in accordance with the description but also executed in parallel or individually in accordance with the processing capacity of a device that executes processing or as necessary. In addition, further change is possible as appropriate within the scope of the present invention.

REFERENCE SIGNS LIST 1, 1', 1", 2 video generation device

The invention claimed is:

1. A video generation device configured to provide illusory motion to a stationary object that is an object which is stationary,
the video generation device comprising processing circuitry configured to generate a video including a stationary object region that is a region of the stationary object and a background region other than the stationary object region or a video including a background region other than a stationary object region in which the stationary object is disposed, wherein
the background region includes a striped-texture region adjacent to an outline of the stationary object region,
a striped texture having a striped luminance pattern moves in a direction having a component orthogonal to the outline in the striped-texture region,
the striped-texture region is adjacent to the outline, and the striped-texture region comprises a width that is sufficiently narrow to maintain the illusory motion of the stationary object as the striped texture having the striped luminance pattern moves in the striped-texture region in the background region.

2. The video generation device according to claim 1, wherein the striped-texture region includes the striped texture of at least one period.

3. A non-transitory computer-readable recording medium storing a program for causing a computer to function as the video generation device according to claim 1.

4. A video generation device configured to provide illusory motion to a stationary object that is an object which is stationary,
the video generation device comprising processing circuitry configured to generate a video including a stationary object region that is a region of the stationary object and a background region other than the stationary object region or a video including a background region other than a stationary object region in which the stationary object is disposed, wherein
the background region includes a striped-texture region adjacent to an outline of the stationary object region, and
a striped texture moves in the striped-texture region, the striped texture having a striped luminance pattern having a smaller amplitude of luminance change at a position farther from the outline.

5. A non-transitory computer-readable recording medium storing a program for causing a computer to function as the video generation device according to claim 4.

6. A video generation device configured to provide illusory motion to a stationary object that is an object which is stationary,
the video generation device comprising processing circuitry configured to generate a video including a stationary object region that is a region of the stationary object and a background region other than the stationary object region or a video including a background region other than a stationary object region in which the stationary object is disposed, wherein
the background region includes a striped-texture region adjacent to an outline of the stationary object region,
the stationary object has a curved outline line adjacent to the striped-texture region, and
a striped texture moves in the striped-texture region, the striped texture having a striped luminance pattern in which a luminance contour line is a curved line geometrically similar to the outline line, the curved line being tilted relative to the outline line.

7. A non-transitory computer-readable recording medium storing a program for causing a computer to function as the video generation device according to claim 6.

* * * * *